Patented Apr. 6, 1948

2,439,214

UNITED STATES PATENT OFFICE 2,439,214

COPOLYMERS OF ALPHA,BETA-ETHYLENICALLY UNSATURATED PHOSPHONIC ACID DERIVATIVES

Richard Vernon Lindsey, Jr., Wilmington, Del., assignor to E. I. du Pont de Nemours & Company, Wilmington, Del., a corporation of Delaware No Drawing. Application May 11, 1944, Serial No. 535,197

8 Claims. (Cl. 260—84)

This invention relates to new compositions of matter and more particularly to new plastic compostions. More specifically, this invention relates to polymers of alpha,beta-ethylenically unsaturated phosphonic acid derivatives.

Alpha,beta-ethylenically unsaturated phosphonic acid compounds including the acids, their esters and their amides have been found to be essentially unpolymerizable by themselves in spite of numerous attempts. Attempts to polymerize these compounds, e. g. dimethyl 1-propene-2-phosphonate and N,N'-dimethyl-1-propene-2-phosphonamide with chloroprene have been completely unsuccessful. Polymerizations of such compounds with butadiene have met with but little success. It was therefore surprising to discover that these compounds interpolymerize satisfactorily with polymerizable compounds containing one, but only one $CH_2=<$ group, i. e. with polymerizable vinyl and vinylidene compounds containing but one ethylenic double bond.

It is an object of this invention to provide a valuable new class of interpolymers of alpha, beta-ethylenically unsaturated phosphonic acid derivatives with polymerizable mono-ethylenic compounds. Further objects will appear hereinafter.

These objects are accomplished by the following invention which comprises heating an alpha, beta-ethylenically unsaturated phosphonic acid, ester, or amide, with one or more polymerizable monovinyl or monovinylidene compounds in the presence of an oxygen-liberating catalyst at a temperature and for a time sufficient to bring about polymerization and isloating the resultant polymer. The polymerization may be conducted in aqueous emulsion, in bulk, or in granular polymerization systems.

The more detailed practice of the invention is illustrated by the following examples, wherein parts are by weight. There are, of course, many forms of the invention other than these specific embodiments.

Example I

Nine (9) parts of dimethyl 1-propene-2-phosphonate, 51 parts of methyl methacrylate and 0.6 part of benzoyl peroxide were charged into a glass-lined reaction vessel. The vessel was then flushed with nitrogen and the contents heated to 45° C. for a period of 48 hours. A clear solid cake of interpolymer containing 3.00% phosphorus was obtained in quantitative yield. The polymer was converted by molding at elevated temperatures and pressure to a tough, transparent, plastic sheet. Complete polymerization may also be effected on heating the same reaction charge for 24 hours at 65° C.

Example II

A dispersing mixture comprising 7.8 parts of commercial sodium cetylsulfate paste (23% active ingredient) and 111 cc. of water was charged into a reaction vessel equipped with an efficient agitator. To this mixture were added 51 parts of methyl methacrylate, 9 parts of dimethyl 1-propene-2-phosphonate, and 0.6 part of ammonium persulfate catalyst. The free space in the vessel was thoroughly flushed with nitrogen, the vessel sealed and the contents heated with stirring for 47 hours at 40° C. The resulting fine dispersion was steamed to remove traces of unreacted monomers and coagulated by adding 20 parts of 10% aluminum sulfate solution. The fine powdery polymer was washed thoroughly with water to remove excess dispersing agent and salts and was finally dried in a current of air, then in a vacuum oven for 24 hours at 50° C. There was obtained 51.9 parts of dry polymer containing 0.77% phosphorus, softening at 101° C. and characterized by excellent flow and molding properties. Moldings of this polymer were very clear with only a faint yellowish tint.

Example III

A solution of 7.8 parts of commercial sodium cetylsulfate paste (23% active ingredient) and 0.6 part of ammonium persulfate in 111 parts of water was charged into a reaction vessel equipped with a mechanical agitator. The free space in the vessel was flushed with nitrogen and a monomer mixture comprising 51 parts of methyl methacrylate and nine parts of N,N,N'N'-tetramethyl-1-propene-2-phosphondiamide was added. The vessel was sealed, heated to 45° C. and maintained at this temperature for a period of 47 hours. At the end of this time, the resulting polymer dispersion was removed from the reaction vessel, steamed to remove unreacted monomers and treated with 20 parts of 10% aluminum sulfate solution. The resulting coagulated polymer was filtered and washed by conventional procedures and dried in vacuo at 50° C. There was obtained 53 parts of a polymer softening at 111° C. and containing 0.57% phosphorus. Attractive moldings were prepared by subjecting the polymer to 1,000 pounds pressure at 160° C. for one minute in a suitable die. Attractive, clear molded articles were obtained.

Example IV

Four and five-tenths (4.5) parts of dimethyl 1-propene-2-phosphonate, 25.5 parts of pure styrene monomer and 0.3 part of benzoyl peroxide were mixed and charged into a glass-lined polymerization vessel. The mixture was heated at 45° C. for a period of approximately 24 hours during which time it was converted to a clear, brilliant colorless resin.

Example V

A stainless-steel-lined, pressure-resistant vessel was charged with 100 parts of water, ten parts of dimethyl 1-propene-2-phosphonate and 0.2 part of benzoyl peroxide. The vessel was closed, evacuated to remove residual air, placed in a shaker machine provided with a heater, pressured with ethylene, and heating and agitation were started. During a reaction time of 9.25 hours, throughout which the temperature was maintained at 74° to 76° C. and the pressure at 860 to 940 atmospheres, there was a total observed pressure drop of 145 atmospheres. The vessel was then cooled, bled of excess ethylene, opened and the contents discharged. The reaction mixture was filtered and the precipitate was washed continuously with water for one hour in a basket centrifuge. The polymer was then dried and there was thus obtained 13 parts of an ethylene/dimethyl 1-propene-2-phosphonate copolymer which contained 7.11% phosphorus from which it is calculated that the ethylene/ester mole ratio was 10.2/1. The relative viscosity as determined on a 0.125% solution in xylene at 85% C. was 1.04 which corresponds to an intrinsic viscosity of 0.31 and to a molecular weight (using Staudinger's hydrocarbon constant) of approximately 2,640.

Tests of this material as an oil adjuvant showed that 0.5% of the polymer in lubricating oil approximately halved the oxygen absorption rate and lowered the pour point from 30° to 0° F., while a 1% concentration of polymer in lubricating oil raised the film strength (Cornell test) from 900 lbs./sq. in. to 1,750 lbs./sq. in.

Example VI

A stainless-steel-lined, pressure-resistant vessel was charged with 100 parts of water, ten parts of N,N,N',N'-tetramethyl-1-propene-2-phosphondiamide and 0.3 part of benzoyl peroxide. Reaction was effected under the conditions of Example V and there was obtained three parts of an ethylene/phosphonamide copolymer which contained 2.23% phosphorus and had an intrinsic viscosity of 0.16. From this analysis, it is calculated that the copolymer had an ethylene/phosphonamide mole ratio of 14.3/1.

Example VII

A stainless-steel-lined, pressure-resistant vessel was charged with 100 parts of water, 20 parts of dibutyl 1-propene-2-phosphonate and 0.2 part of benzoyl peroxide. Reaction was carried out under substantially the conditions of Example V and the reaction mixture yielded 21 parts of an ethylene/dibutyl 1-propene-2-phosphonate copolymer which contained 5.6% phosphorus and had an intrinsic viscosity of 0.24. From this analysis, it is calculated that the copolymer had an ethylene/ester mole ratio of 11.2/1.

Example VIII

A silver-lined, pressure-resistant vessel was charged with 100 parts of water, 4 parts of dimethyl 1-propene-2-phosphonate and 0.3 part of benzoyl peroxide. The pH of this mixture was adjusted from 6.1 to 3.4 by the addition of a few drops of dilute formic acid. The reaction was carried out substantially as in Example V. In a reaction time of 9.5 hours, throughout which the temperature was maintained at 73° to 78° C. and the pressure at 760 to 950 atmospheres, there was a total observed pressure drop of 425 atmospheres. The polymer was isolated as in Example V. There was thus obtained 28 parts of an ethylene/dimethyl 1-propene-2-phosphonate copolymer which contained 2.3% phosphorus, corresponding to an ethylene/ester mole ratio of 42/1 and which had an intrinsic viscosity of 0.79 and a tensile strength at break of 1,290 lbs./sq. in. (original dimensions) at 215% elongation. Films of this copolymer could be readily cold drawn to 575% of their original length. They showed excellent tear resistance.

By substituting diphenyl 1-propene-2-phosphonate and 1-phenylethylene-1-phosphonic acid respectively, for dimethyl 1-propene-2-phosphonate in Example VIII, the corresponding copolymers of these compounds with ethylene were prepared.

Although in the foregoing examples certain definite interpolymer combinations, conditions of polymerization and reaction temperatures have been described, it is to be understood that these in no way limit the invention within the spirit and scope thereof. Broadly speaking, this invention contemplates the preparation of interpolymers of alpha,beta-ethylenically unsaturated phosphonic acids and derivatives by the interpolymerization of alpha,beta-ethylenically unsaturated phosphonic acids and derivatives with polymerizable compounds having but one $CH_2=C<$ group, i. e. monovinyl and monovinylidene compounds, according to the bulk, granulation or emulsion polymerization techniques known to the art. Depending on the conditions of polymerization selected, the formation of polymer may occur at temperatures between about 20° C. and 120° C., preferably in the presence of an oxygen-liberating catalyst, such as benzoyl peroxide, lauroyl peroxide, ammonium persulfate, sodium perborate, peroxydisuccinic acid, diethyl peroxide and the like. If the bulk polymerization technique is employed, it is preferred to use a soluble peroxide catalyst of the type represented by benzoyl peroxide. Aqueous emulsion polymerizations are best carried out in the presence of soluble persulfate salts. The choice of specific conditions of polymerization will of course be governed by the type and kind of product desired and the uses to which it is to be put. In general, bulk polymerized products are clear, tough plastics whereas those produced in emulsion may contain impurities introduced from the dispersing agent or catalyst which are difficult to remove. For many uses, however, these impurities present no disadvantage.

Depending on the type of monomer selected for the polymerization, the process may be carried out under atmospheric pressure or under superatmospheric pressures in closed equipment. It is desirable to flush the polymerization vessel with an inert gas, such as nitrogen, in order to exclude air from the polymerization system.

In emulsion polymerizations, it is preferred to use synthetic dispersing agents, such as long chain alkyl sulfuric ester salts, soluble salts of sulfonated long chain hydrocarbons, salts of alkylated naphthalenesulfonic acids, soaps of saturated or unsaturated fatty acids, and soluble salts of sulfonated oleic esters. Other types of dispersing agents may also be used, depending on the nature of the vinyl or vinylidene monomers chosen for copolymerization with the unsaturated phosphonic acid derivatives.

The alpha,beta-ethylenically unsaturated phosphonic acid derivatives coming within the scope of this invention are exemplified by 1-propene-2-phosphonic acid, the dialkyl esters of 1-propene-2-phosphonic acid, e. g. dimethyl and dibutyl 1-propene-2-phosphonates, and the N,N,N',N'-tetraalkyl-1-propene-2-phosphondiamides, e. g. N,N,N',N' - tetramethyl - 1 - propene - 2 - phosphondiamide. Other alpha,beta-ethylenically unsaturated phosphonic acids, esters and amides may be employed. A preferred group are the alkene phosponic acids and derivatives in which the phosphono group is attached to one of the double bonded carbons and which have the following general formula:

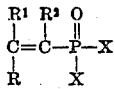

wherein X equals OH, OR³

and R, R¹, R⁴, and R⁵ are hydrogen or alkyl radicals, R² is an alkyl radical and R³ is an alkyl or aryl radical. These alpha,beta-ethylenically unsaturated phosphonic acid derivatives can be prepared according to the processes described in Hamilton U. S. Patent 2,365,466 which issued on application Serial No. 463,079, filed October 23, 1942, the disclosure of which is hereby incorporated. Other acids, esters and amides of these 1-alkene-2-phosphonic acids are the diethyl, diamyl, dibenzyl, and diphenyl esters and the N,N,N',N'-tetraethyl-, N,N,N'N'-tetrabutyl-, N,N,N',N' - tetraamyl-, N,N,N',N' - tetrabenzyl-, and the N,N,N',N' - tetraphenyl - 1 - propene-2-phosphondiamides.

The invention is generic to interpolymers and interpolymerization of the phosphonic acid derivatives as above set forth, with polymerizable organic compounds having one, and only one CH₂=C< group, i. e. with monovinyl and monovinylidene compounds exemplified by methyl acrylate, methyl methacrylate, higher alkyl methacrylates, styrene, ethylene, acrylonitrile, vinyl chloride, vinyl acetate, vinylidene chloride and N-vinyl compounds, such as N-vinyl imides and N-vinyl amides. The proportion of the phosphonic acid and derivatives can be varied between 95% and 5% of the total polymerization mixture with corresponding amounts of the appropriate vinyl or vinylidene monomers. In addition, interpolymer systems involving two or more monovinyl and monovinylidene compounds in combination with the unsaturated phosphonic acid derivatives may be used to give valuable products.

The polymers of this invention are useful as molding plastics, for films, fibers and coating compositions for metals, fabrics and leather. Products containing the phosphonic acid derivatives are characterized by excellent clarity and by good stability on exposure to heat and light.

The above description and examples are intended to be illustrative only. Any modification thereof, or variation therefrom which conforms to the spirit of the invention is intended to be included within the scope of the claims.

What is claimed is:

1. An interpolymer of dimethyl 1-propene-2-phosphonate with methyl methacrylate containing 5–95% dimethyl 1-propene-2-phosphonate and 95–5% methyl methacrylate.

2. An interpolymer of 5 to 95% methyl methacrylate with 95–5% of a dialkyl 1-propene-2-phosphonate.

3. An interpolymer of 5–95% of a phosphonic compound of the class consisting of dialkyl esters, diaryl esters and tetraalkyldiamides of alkene phophonic acids in which acids the phosphorus is bonded to carbon of an alkenyl radical, said carbon being ethylenically doubly bonded to a second carbon of said radical, and 95–5% of a comonomer of the class consisting of alkyl methacrylates, methyl acrylate, styrene, ethylene, acrylonitrile, vinyl chloride, vinyl acetate, and vinylidene chloride.

4. An interpolymer according to claim 3 wherein the comonomer is an alkyl methacrylate.

5. An interpolymer according to claim 3 wherein the comonomer is methyl methacrylate.

6. An interpolymer of an alkyl ester of an alkene-phosphonic acid in which the phosphorus is bonded to carbon of an alkenyl radical, said carbon being ethylenically doubly bonded to a second carbon of said radical, said interpolymer containing 5–95% of said ester, the remainder of said interpolymer consisting of a comonomer of the class consisting of alkyl methacrylates, methyl acrylate, styrene, ethylene, acrylonitrile, vinyl chloride, vinyl acetate, and vinylidene chloride.

7. An interpolymer according to claim 6 wherein the dialkyl ester is a dialkyl 1-propene-2-phosphonate.

8. An interpolymer according to claim 6 wherein the alkyl ester is dimethyl 1-propene-2-phosphonate.

RICHARD VERNON LINDSEY, JR.

REFERENCES CITED

The following references are of record in the file of this patent:

UNITED STATES PATENTS

| Number | Name | Date |
| --- | --- | --- |
| 2,389,576 | Kosolapoff | Nov. 20, 1945 |

OTHER REFERENCES

Chem. Abst., vol. 35, page 3963 (1941).

Certificate of Correction

Patent No. 2,439,214. April 6, 1948.

RICHARD VERNON LINDSEY, Jr.

It is hereby certified that errors appear in the printed specification of the above numbered patent requiring correction as follows: Column 1, line 19, for "$CH_2=<$ group" read $CH_2=C<group$; column 3, line 34, for "85% C." read $85°\ C.$; line 38, for the number "2.640" read $2,640$; column 6, line 23, claim 3, for "phophonic" read *phosphonic*; and that the said Letters Patent should be read with these corrections therein that the same may conform to the record of the case in the Patent Office.

Signed and sealed this 1st day of June, A. D. 1948.

[SEAL]

THOMAS F. MURPHY,
*Assistant Commissioner of Patents.*